United States Patent
Ozeki et al.

(10) Patent No.: US 8,067,122 B2
(45) Date of Patent: Nov. 29, 2011

(54) FUEL CELL SYSTEM

(75) Inventors: Masataka Ozeki, Osaka (JP); Akinari Nakamura, Osaka (JP); Hideo Ohara, Osaka (JP)

(73) Assignee: Panasonic Corporation, Osaka (JP)

( * ) Notice: Subject to any disclaimer, the term of this patent is extended or adjusted under 35 U.S.C. 154(b) by 674 days.

(21) Appl. No.: 12/297,365

(22) PCT Filed: Apr. 17, 2007

(86) PCT No.: PCT/JP2007/058372
§ 371 (c)(1),
(2), (4) Date: Oct. 16, 2008

(87) PCT Pub. No.: WO2007/123136
PCT Pub. Date: Nov. 1, 2007

(65) Prior Publication Data
US 2009/0092883 A1 Apr. 9, 2009

(30) Foreign Application Priority Data
Apr. 19, 2006 (JP) ................................ 2006 1156659

(51) Int. Cl.
*H01M 8/06* (2006.01)
(52) U.S. Cl. ........................... 429/425; 429/429; 429/25
(58) Field of Classification Search .................... 429/22, 429/25, 26, 425, 429
See application file for complete search history.

(56) References Cited

U.S. PATENT DOCUMENTS
2003/0198842 A1 * 10/2003 Nishida et al. .................. 429/19

FOREIGN PATENT DOCUMENTS

| JP | 05-047401 | 2/1993 |
|---|---|---|
| JP | 2001-023659 | 1/2001 |
| JP | 2001-176528 | 6/2001 |
| JP | 2001-185182 | 7/2001 |
| JP | 2003-229149 | 8/2003 |
| JP | 2003-229156 | 8/2003 |
| JP | 2004-296235 | 10/2004 |
| JP | 2005-228621 | 8/2005 |
| WO | WO 2005/015673 A1 | 2/2005 |

* cited by examiner

*Primary Examiner* — David Vu
(74) *Attorney, Agent, or Firm* — McDermott Will & Emery LLP

(57) ABSTRACT

A fuel cell system is provided, the system comprising: a fuel cell (1) configured to generate electric power by use of a fuel gas; a reformer (2) configured to generate the fuel gas by reforming a raw material; a combustion burner (2a) configured to supply heat for reforming; a raw material feeder (10) configured to control the feed rate of combustion fuel to the combustion burner; a combustion fan (2b) configured to supply air to the combustion burner; a fuel gas passage (R1, R4); an off gas passage (R3, R5); a bypass passage (R2); a switching valve (8); and a controller (101), wherein the inside of the fuel cell is filled with the raw material before the fuel gas is supplied, and wherein the controller controls the raw material feeder so as to reduce the feed rate of the combustion fuel to the combustion burner when controlling the switching valve so as to shut off the bypass passage to supply the fuel gas generated in the reformer to the fuel cell. This fuel cell system is environmentally-friendly and capable of suppressing the emission of carbon monoxide at the start of a power generating operation to mitigate the adverse effect upon the ecosystem.

14 Claims, 7 Drawing Sheets

FUEL CELL SYSTEM

RELATED APPLICATIONS

This application is the US National Phase under 35 U.S.C. §371 of International Application No. PCT/JP2007/05872 filed on Apr. 17, 2007, which claims the benefit of Japanese Application Nos. JP2006-115659, the disclosures of which Applications are incorporated by reference herein.

TECHNICAL FIELD

The present invention relates to a fuel cell system for generating electric power by use of hydrogen and oxygen. More particularly, the present invention relates to a fuel cell system that utilizes the combustion heat of flammable material to generate hydrogen from raw material and uses this hydrogen for power generation.

BACKGROUND ART

In fuel cell systems capable of high-efficiency, small-scale power generation, it is easy to construct a system for utilizing heat energy generated during power generation. Thanks to this, fuel cell systems have heretofore been developed as a dispersed power generation system capable of achievement of high energy utilization efficiency.

Fuel cell systems have fuel cell as the main body of the power generation section. The fuel cell directly converts the chemical energy of fuel gas and oxidizing gas into electric energy through a predetermined electrochemical reaction. Therefore, in the fuel cell systems, the fuel gas and oxidizing gas are respectively supplied to the fuel cell during power generating operation. Then, in the fuel cell, the specified electrochemical reaction which uses the supplied fuel gas and oxidizing gas proceeds, thereby generating electric energy. The electric energy generated in the fuel cell is fed to loads from the fuel cell system. The fuel cell systems discussed herein generally include a reformer and a blower. In the reformer, the hydrogen-rich fuel gas is generated by the steam reforming reaction which uses water and a raw material containing an organic compound composed of at least carbon and hydrogen, which is a natural gas. This fuel gas is supplied to the fuel cell as a fuel for power generation. It should be noted that the steam reforming reaction proceeds with the reforming catalyst of the reformer being heated by, for example, a combustion burner. The blower suctions air from the atmosphere. This air is fed to the fuel cell as the oxidizing gas used for power generation.

In a heretofore known fuel cell system, when stopping a power generating operation, the supply of the raw material to the reformer is cut off. This stops the supply of the fuel gas from the reformer to the fuel cell, stopping the progress of the electrochemical reaction in the fuel cell. As a result, the supply of electric power from the fuel cell system to the loads is stopped. If the supply of the raw material to the reformer is cut off, the fuel gas, which has been generated before the cutoff of the raw material, will stagnate in the fuel cell and its surrounding area throughout the period during which the power generating operation is stopped. In this case, if the stagnant fuel gas is mixed with air coming from the combustion burner opened to the atmosphere owing to natural convection, hydrogen contained in the fuel gas will be rapidly oxidized by oxygen contained in the air, which gives rise to a risk that the fuel cell system may be damaged by the reaction heat generated by the oxidation reaction.

To prevent the stagnation of the fuel gas within the fuel cell system, the known fuel cell system is configured to feed inert gas such as nitrogen gas to the passage where the fuel gas is stagnant during a power generation stop period and to burn the fuel gas forced out of the passage in a combustion burner. According to this configuration, the stagnation of the fuel gas within the fuel cell etc. during a power generation stop period can be prevented and therefore the rapid oxidation of hydrogen contained in the fuel gas can be prevented so that the fuel cell system ensures high security.

This known fuel system, however, requires an inert gas feeding means such as a nitrogen cylinder installed within or near the fuel cell system in order to replace the stagnant fuel gas with the inert gas such as nitrogen gas. This makes the fuel cell system large-sized and therefore makes it difficult to use the fuel cell system as a stationary dispersed power generation system for household use or an electrical vehicular power plant. Furthermore, the use of the feeing means of the inert gas such as nitrogen gas in addition to the existing components increases the initial cost of the fuel cell system. In addition, the known fuel cell system needs periodical replacement or replenishment of the inert gas feeding means such as a nitrogen cylinder, which leads to an increase in the running cost of the fuel cell system.

In this known fuel cell system, just after the start of a power generating operation, the fuel gas containing a high concentration of carbon monoxide is supplied from the reformer to the fuel cell. The reason for this is that the operating temperature of the reformer has not reached a specified value at the start of a power generating operation and therefore a sufficient amount of carbon monoxide cannot be removed from the fuel gas. If a solid polymer electrolyte fuel cell, for example, is supplied with the fuel gas containing a high concentration of carbon monoxide, the catalyst of the fuel electrode of the solid polymer electrolyte fuel cell will be poisoned by the carbon monoxide supplied. The poisoning of the catalyst of the fuel electrode significantly hinders the progress of the electrochemical reaction in the fuel cell. Therefore, the known fuel cell system suffers from the problem that the power generating performance of the fuel cell deteriorates, depending upon the number of stops and starts of power generating operation.

As a fuel cell system that can be easily used in the home and electric cars and is unlikely to cause progressive poisoning of the catalyst, there has been proposed a fuel system that is configured to cut off the supply of the fuel gas to the fuel cell just after the start of a power generating operation and to introduce, as a substitution gas, the raw material of the fuel gas into the fuel cell after stopping the power generating operation (e.g., Patent Document 1).

The proposed fuel cell system is comprised of: a reformer for generating a hydrogen-rich fuel gas from a raw material containing as a chief component an organic compound that contains carbon and hydrogen; a fuel gas feed passage for feeding a fuel gas from the reformer to a fuel cell; an off gas feed passage for feeding the fuel gas, which has been discharged from the fuel cell without being used in power generation (hereinafter referred to as "off gas"), to a combustion burner of the reformer; and a first bypass route provided between the fuel gas feed passage and the off gas feed passage, for switching the destination of the fuel gas from the fuel cell to the combustion burner of the reformer. This fuel cell system also comprises a raw material feeder for feeding the raw material of the fuel gas to the reformer and a second bypass route for feeding the raw material directly from the raw material feeder to the fuel cell, so as to bypass the reformer.

In the proposed fuel cell system, just after the start of a power generating operation, the fuel gas containing a high concentration of carbon monoxide and generated in the reformer is supplied to the combustion burner of the reformer by way of the first bypass route. In the combustion burner, the fuel gas is combusted to heat the reforming catalyst. After the temperature of the reforming catalyst in the reformer has reached a specified value after the start of a power generating operation, the fuel gas generated in the reformer is supplied to the fuel cell by way of the fuel gas feed passage. Then, the fuel gas is used as a fuel for power generation in the fuel cell. The off gas discharged from the fuel cell is supplied to the combustion burner of the reformer by way of the off gas feed passage. Then, the off gas is combusted for heating the reforming catalyst in the combustion burner.

In the proposed fuel cell system, after stopping the power generating operation, the raw material serving as a substitution gas is introduced from the raw material feeder to a fuel gas flow path of the fuel cell by way of the second bypass route. Thereby, the inside of the fuel cell and its surrounding area are sealed up by the raw material instead of the inert gas such as nitrogen gas throughout the period during which the power generating operation of the fuel cell system is stopped.

According to this fuel cell system, the raw material serving as a substitution gas is introduced into the fuel cell from the conventionally-used raw material feeder after stopping the power generation, which eliminates the need for provision of an inert gas feeding means such as a nitrogen cylinder within or in the proximity of the fuel cell system. The fuel cell system can avoid growing in size and therefore can be used as a stationary dispersed power generation system for household use or an electrical vehicular power plant. In addition, since there is no need to provide an inert gas (nitrogen gas) feeding means in addition to existing components, the initial cost of the fuel cell system can be kept low. Furthermore, periodical replacement of an inert gas (nitrogen gas) feeding means is unnecessary, which makes it possible to keep the running cost of the fuel cell system low.

The material introduced from the raw material feeder into the fuel cell is chemically stable compared to hydrogen contained in the fuel gas. Therefore, even if the raw material, stagnating in the fuel cell throughout a power generating operation stop period, is mixed with air penetrating thereinto, no rapid oxidizing reaction will occur. Accordingly, damage to the fuel cell system caused by reaction heat generated in the oxidizing reaction can be effectively prevented, by introducing the raw material into the fuel cell. In this way, the fuel cell system can ensure security in the power generating operation stop period.

In the proposed fuel cell system, the fuel gas containing a high concentration of carbon monoxide is not supplied to the fuel cell just after the start of a power generating operation. After the temperature of the reforming catalyst in the reformer has reached the specified temperature and the fuel gas whose carbon monoxide concentration has been sufficiently reduced is generated, the fuel gas is supplied from the reformer to the fuel gas. This prevents the poisoning of the catalyst of the fuel electrode in the solid polymer electrolyte fuel cell. Thus, the factors that interrupt the progress of the electrochemical reaction in the fuel cell are swept away and therefore the problem that the power generating performance of the fuel cell deteriorates depending on the number of stops and starts of power generating operation can be solved.

Patent Document 1: Japanese Laid-Open Patent Application Publication No. 2003-229149

DISCLOSURE OF THE INVENTION

Problems that the Invention Intends to Solve

However, the above previous proposal has revealed the following problem. When a supply of the fuel gas from the reformer to the fuel cell starts after the temperature of the reforming catalyst in the reformer has reached a specified value, the raw material, which has been introduced from the raw material feeder into the fuel cell after stopping the power generating operation, is forced out of the fuel cell by the fuel gas being fed from the reformer and is supplied to the combustion burner of the reformer over a specified period of time. Because of this, oxygen runs out in the combustion burner, causing incomplete combustion and therefore carbon monoxide is released to the atmosphere during the specified period.

More concretely, the combustion burner in the reformer basically combusts hydrogen contained in the off gas in order to promote the steam reforming reaction. For complete combustion of hydrogen, the amount of air corresponding to the feed rate of hydrogen is fed from the combustion fan adjacent to the combustion burner.

When a supply of the fuel gas from the reformer to the fuel cell starts after the temperature of the reforming catalyst in the reformer has reached a specified value, the combustion burner is supplied with the raw material (e.g., natural gas) discharged from the fuel cell for a specified period of time, the raw material containing an organic compound composed of at least carbon and hydrogen. To completely combust this raw material, an amount of air more than the amount necessary for complete combustion of hydrogen is required. However, the feed rate of air supplied from the combustion fan to the combustion burner is determined to be equal to the feed rate of air necessary for complete combustion of hydrogen as stated earlier. Therefore, oxygen shortage occurs, accompanied with incomplete combustion of the raw material during the specified period of time in the combustion burner. As a result, the combustion burner discharges carbon monoxide in the specified period during which the raw material such as natural gas is supplied to the combustion burner.

As has been described above, the above proposed fuel cell system has the problem that carbon monoxide is discharged from the system to the atmosphere for a specified period of time after starting a supply of the fuel gas from the reformer to the fuel cell at the start of power generating operation. Carbon monoxide is known to be significantly toxic to human beings. For instance, carbon monoxide combines with hemoglobin contained in blood thereby generating carbonyl hemoglobin, which considerably disturbs the oxygen transfer function of hemoglobin. Therefore, there exists a concern that human life may be adversely affected if a large number of such fuel cell systems come into wide use and discharge large amounts of carbon monoxide to the atmosphere.

The invention has been made taking account of the background described above and therefore an object of the invention is to provide an environmentally-friendly fuel cell system capable of effectively suppressing carbon monoxide emission at the start of a power generating operation with a simple structure to mitigate the adverse effect on the ecosystem.

Means for Solving the Problems

In accomplishing the above object, there is provided, according to the invention, a fuel cell system comprising:

a fuel cell configured to generate electric power by use of a fuel gas and an oxidizing gas;

a fuel gas generator configured to generate the fuel gas by reforming a raw material through a reforming reaction;

a combustor configured to supply heat to said fuel gas generator to promote the reforming reaction;

a combustion fuel feeder configured to control a feed rate of combustion fuel to said combustor;

an air feeder configured to supply air to said combustor;

a fuel gas passage configured to supply the fuel gas from said fuel gas generator to the fuel cell;

an off gas passage configured to supply part of the fuel gas from the fuel cell to said combustor, which part has been left without being used in the electric power generation;

a bypass passage configured to connect the fuel gas passage and the off gas passage such that the fuel gas generated in said fuel gas generator is supplied to said combustor, so as to bypass the fuel cell;

a switching valve configured to switch the destination of the fuel gas generated in said fuel gas generator between the fuel cell and the bypass passage; and a controller, wherein an inside of the fuel cell is filled with the raw material before the controller controls the switching valve so as to switch from the bypass passage to the fuel cell to supply the fuel gas generated in said fuel gas generator to the fuel cell, and wherein the controller controls the combustion fuel feeder so as to reduce the feed rate of the combustion fuel to the combustor when controlling the switching valve so as to switch from the bypass passage to the fuel cell to supply the fuel gas generated in said fuel gas generator to the fuel cell.

In the above fuel cell system wherein the inside of the fuel cell is filled with the raw material before the fuel gas generated in said fuel gas generator is supplied to the fuel cell by switching from the bypass passage to the fuel cell, the combustion fuel can be supplied to the combustor at an appropriate feed rate and, in consequence, the emission of carbon monoxide from the fuel cell system at the start of a power generating operation can be effectively suppressed.

The above system may be configured such that the combustion fuel feeder is a raw material feeder configured to control a feed rate of the raw material to the fuel gas generator, and the controller controls the raw material feeder so as to reduce the feed rate of the raw material when controlling the switching valve so as to switch from the bypass passage to the fuel cell to supply the fuel gas generated in the fuel gas generator to the fuel cell.

In accordance with this configuration, the raw material feeder is configured to adjust the feed rate of the raw material to the fuel gas generator. Therefore, the feed rate of the combustion fuel to the combustor can be reduced without additionally incorporating a special device into the conventional fuel cell system configuration, by controlling the raw material feeder so as to reduce the feed rate of the raw material.

The above system may be configured such that the controller controls the combustion fuel feeder so as to reduce the feed rate of the combustion fuel to the combustor in accordance with a composition of the raw material that fills the inside of the fuel cell.

In accordance with this configuration, the feed rate of the combustion fuel to the combustor can be reduced according to the composition of the raw material that fills the inside of the fuel cell and therefore a limitation on the types of the raw material that fills the inside of the fuel cell can be eliminated.

The above system may be configured such that the controller controls the combustion fuel feeder so as to satisfy an air ratio of 1 or more to reduce the feed rate of the combustion fuel to the combustor, while controlling the air feeder so as to maintain a feed rate of the air to the combustor.

In accordance with the above configuration, when the feed rate of air supplied from the air feeder to the combustor is maintained, the feed rate of the combustion fuel to the combustor is reduced so as to satisfy an air ratio of 1 or more. Therefore, the emission of carbon monoxide from the fuel cell system at the start of a power generating operation can be suppressed without fail.

The above system may be configured such that the controller controls the switching valve such that the fuel gas generated in the fuel gas generator is supplied to the combustor by way of the bypass passage until the fuel gas generator satisfies a specified operating condition, and when the specified operating condition is satisfied, the controller controls the switching valve so as to switch the destination of the fuel gas generated in the fuel gas generator from the bypass passage to the fuel cell and controls the combustion fuel feeder so as to reduce the feed rate of the combustion fuel to the combustor.

In accordance with this configuration, since the fuel gas containing a high concentration of carbon monoxide is not supplied to the fuel cell but supplied to the combustor until the fuel gas generator satisfies a specified operating condition, poisoning of the catalyst of the fuel electrode in the fuel cell can be suppressed. In addition, when the fuel gas generator satisfies the specified operating condition, the fuel gas is supplied to the fuel cell while the feed rate of the combustion fuel to the combustor is reduced. Therefore, the emission of carbon monoxide from the fuel cell system at the time of feeding the fuel gas from the fuel gas generator to the fuel cell can be effectively suppressed without fail.

The above system may be configured such that the controller controls the combustion fuel feeder to reduce the feed rate of the combustion fuel to the combustor, before controlling the switching valve so as to shut off the bypass passage to allow a supply of the fuel gas from the fuel gas generator to the fuel cell.

In accordance with this configuration, since the feed rate of the combustion fuel to the combustor is reduced before a supply of the fuel gas from the fuel gas generator to the fuel cell becomes possible, the emission of carbon monoxide from the fuel cell system can be effectively suppressed without fail.

The above system may be configured such that the controller controls the combustion fuel feeder so as to increase the feed rate of the combustion fuel to the combustor, after an elapse of a specified period of time after the controller controls the combustion fuel feeder so as to reduce the feed rate of the combustion fuel to the combustor.

In accordance with this configuration, since the feed rate of the combustion fuel to the combustor is increased after an elapse of a specified period of time, changes in the feed rate of the combustion fuel to the combustor can be properly controlled.

The above system may further comprise a CO detector configured to detect carbon monoxide contained in an exhaust gas discharged from the combustor and may be configured such that the controller controls the combustion fuel feeder so as to increase the feed rate of the combustion fuel to the combustor, when an output value of the CO detector drops to a specified value or less or the concentration of carbon monoxide obtained based on the output value of the CO detector drops to a specified value or less, after the controller controls the combustion fuel feeder so as to reduce the feed rate of the combustion fuel to the combustor.

In accordance with this configuration, since the system further comprises the CO detector configured to detect carbon monoxide contained in the exhaust gas discharged from the combustor, changes in the feed rate of the combustion fuel to the combustor can be properly controlled.

The above system may be configured such that the controller controls the combustion fuel feeder so as to reduce the feed rate of the combustion fuel to the combustor in a stepwise fashion involving one or more steps, or in a continuous fashion.

In accordance with this configuration, since the feed rate of the fuel combustion to the combustor can be ideally reduced, the emission of carbon monoxide can be effectively suppressed.

In the above system, the raw material may be hydrocarbon gas.

In accordance with this configuration, natural gas, propane gas and the like, which are commonly used as hydrocarbon gas, can be used as the raw material. This facilitates construction of a preferred fuel cell system capable of suppressing the emission of carbon monoxide at the start of a power generating operation.

The above system may further comprise a raw material feeder configured to supply the raw material, and may be configured such that the controller allows the raw material feeder to supply the raw material to the fuel cell to fill the inside of the fuel cell with the raw material in shutdown operation or start-up operation.

In accordance with this configuration, since the fuel cell system has the raw material feeder capable of supplying the raw material to the inside of the fuel cell, the inside of the fuel cell can be easily filled with the raw material during shutdown or start-up of the fuel cell system.

The above system may further comprise a gas concentration detector provided in the combustor or the off gas passage, for detecting a specified gas concentration, and may be configured such that the controller controls the combustion fuel feeder in response to an output signal from the gas concentration detector to reduce the feed rate of the combustion fuel to the combustor, after controlling the switching valve so as to switch from the bypass passage to the fuel cell to allow a supply of the fuel gas generated in the fuel gas generator to the fuel cell.

In accordance with this configuration, the combustor or the off gas passage is provided with a gas concentration detector for detecting a specified gas concentration, and the combustion fuel feeder is controlled in response to an output signal from the gas concentration detector to reduce the feed rate of the combustion fuel to the combustor. This further facilitates more ideal reduction of the feed rate of the combustion fuel to the combustor so that the emission of carbon monoxide can be more effectively suppressed.

The fuel cell system may be configured such that the controller controls the combustion fuel feeder so as to reduce the feed rate of the combustion fuel to the combustor, when the gas concentration detector detects an increase in raw material concentration.

In accordance with this configuration, since the feed rate of the combustion fuel to the combustor is reduced if the gas concentration detector detects an increase in the raw material concentration, the emission of carbon monoxide from the fuel cell system at the start of a power generating operation can be properly suppressed.

The above system may comprise a flame-rod type flame sensor provided in the combustor as the gas concentration detector and the raw material may be a gas containing hydrocarbon. And, the above system may be configured such that the controller controls the combustion fuel feeder to reduce the feed rate of the combustion fuel to the combustor, when the flame sensor detects an increase in the raw material concentration after the controller controls the switching valve so as to switch from the bypass passage to the fuel cell to allow a supply of the fuel gas generated in the fuel gas generator to the fuel cell.

In accordance with this configuration, the combustor has a commonly-used, flame-rod type flame sensor as the gas concentration detector. This enables it to suppress the emission of carbon monoxide at the start of a power generating operation in a conventional fuel cell system configuration without additional use of a gas concentration detector.

Effects of the Invention

According to the invention, an environmentally-friendly fuel cell system can be provided in which carbon monoxide emission at the start of a power generating operation can be effectively suppressed with a simple structure to mitigate the adverse effect on the ecosystem.

BRIEF DESCRIPTION OF THE DRAWINGS

FIG. 3 is diagrams that schematically show changes in the feed rate of a raw material supplied from a raw material feeder to a reformer, wherein

EXPLANATION OF REFERENCE NUMERALS

Figure 1:
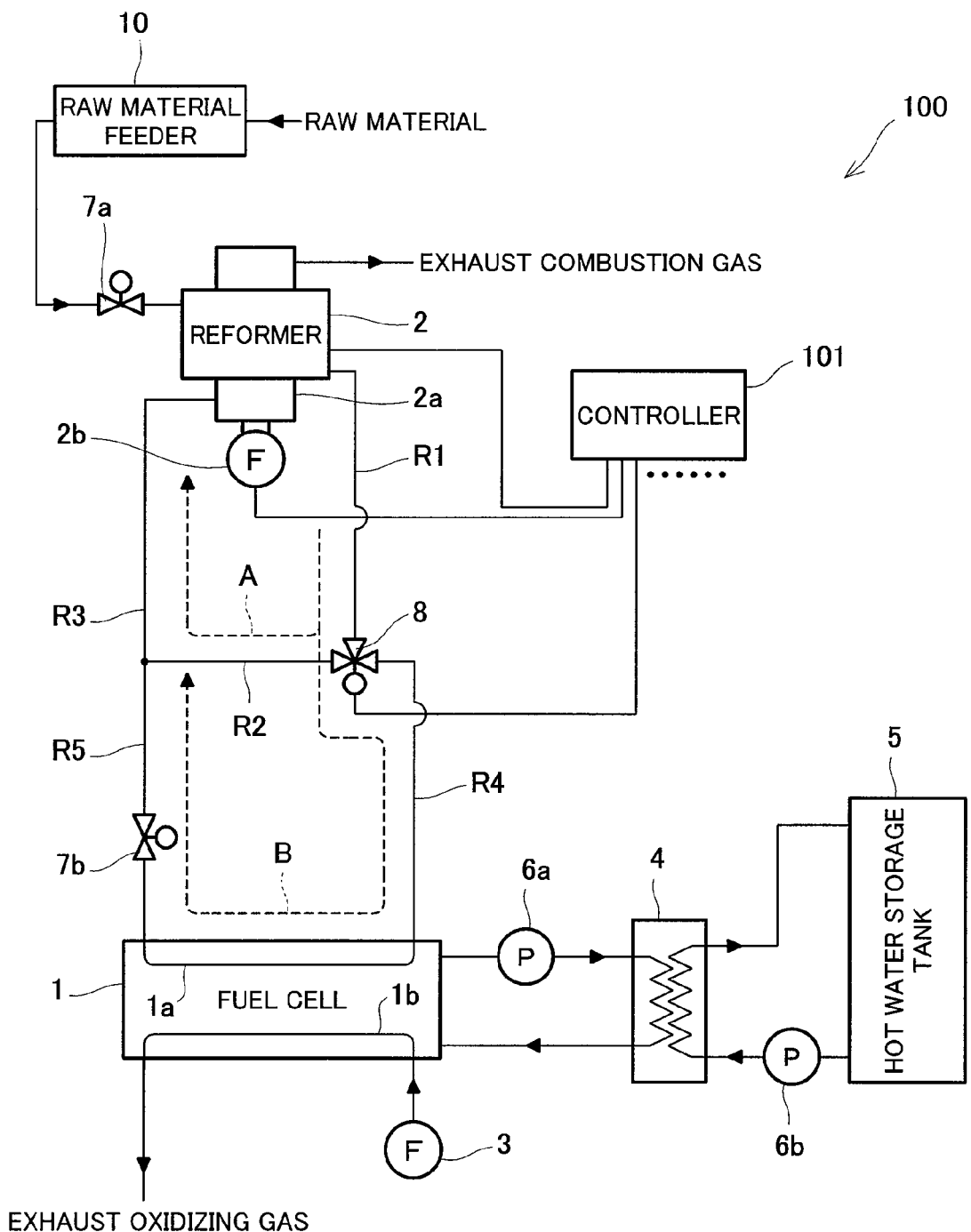
FIG. 1 is a block diagram that schematically shows a configuration of a fuel cell system according to a first embodiment of the invention.

1: fuel cell
1a: fuel gas flow path
1b: oxidizing gas flow path
2: reformer
2a: combustion burner
2b: combustion fan
3: blower
4: heat exchanger
5: hot water storage tank
6a, 6b: pump
7a, 7b: on-off valve 8: three-way valve
9: CO sensor
10: raw material feeder
11: flame sensor
12: flow rate control valve
100-300: fuel cell system
101: controller
R1: first route
R2: second route
R3: third route
R4: fourth route
R5: fifth route
A: first fuel gas passage
B: second fuel gas passage

BEST MODE FOR CARRYING OUT THE INVENTION

Referring now to the accompanying drawings, the best mode for carrying out the invention will be described in detail.

First Embodiment

First of all, the details of the configuration of a fuel cell system according to a first embodiment of the invention will be described with reference to the drawings.

FIG. 1 is a block diagram that schematically shows the configuration of the fuel cell system according to the first embodiment of the invention. In FIG. 1, the solid lines connecting the components of the fuel cell system represent the passages where water, fuel gas, oxidizing gas, electric signals and the like flow respectively. The arrows on the solid lines indicate the flowing directions of the water, fuel gas, oxidizing gas etc., respectively when the fuel cell system is in normal operation. It should be noted that FIG. 1 shows only the components necessary for describing the invention and other components are omitted from FIG. 1.

As illustrated in FIG. 1, the fuel cell system 100 of this embodiment has a fuel cell 1 that serves as the main body of the power generating section thereof. As the fuel cell 1, a solid polymer electrolyte fuel cell is employed in this embodiment. The fuel cell 1 performs power generation to output a predetermined amount of electric power, using a hydrogen-rich fuel gas and an oxidizing gas (air is usually used), the fuel gas being supplied from a fuel gas generator (described later) to a fuel gas flow path 1a of the fuel cell 1 whereas the oxidizing gas is supplied from a blower 3 (described later) to an oxidizing gas flow path 1b of the fuel cell 1. In other words, the fuel cell 1 directly converts the chemical energy of the fuel gas and the oxidizing gas into electric energy through a specified electrochemical reaction that is promoted by a specified reaction catalyst. By such energy conversion, the fuel cell 1 supplies electric energy to the loads connected to the fuel cell system 100.

In this embodiment, the oxidizing gas supplied to the oxidizing gas flow path 1b of the fuel cell 1 is preliminarily treated so as to be in a specified humidified condition, with the moisture of the oxidizing gas that has been used in power generation within the fuel cell 1. If the degree to which the oxidizing gas has been humidified is insufficient, part of water stored in a water storage tank (not particularly shown in FIG. 1) is made to be evaporated within the fuel cell 1 to thereby adjust the humidity of the oxidizing gas to a proper level. In addition, the fuel gas that is supplied to the fuel gas flow path 1a of the fuel cell 1 is preliminarily brought into a specified humidified condition in the above-mentioned fuel gas generator.

During a power generating operation, the fuel cell 1 generates heat through the specified electrochemical reaction for the energy conversion. The heat generated by the fuel cell 1 is retrieved, in a continuous manner, by cooling water supplied to a cooling water flow path (not particularly shown in FIG. 1) formed in the fuel cell 1. The heat retrieved by the cooling water is utilized within a heat exchanger 4 (described later) for heating water supplied from a hot water storage tank 5 (described later).

The inner configuration of the fuel cell 1 is the same as of commonly used solid polymer electrolyte fuel cells and therefore a detailed explanation thereof is omitted herein.

As shown in FIG. 1, the fuel cell system 100 has at least a reformer 2 as the fuel gas generator of the invention. The reformer 2 mainly promotes steam reforming reaction to generate the hydrogen-rich fuel gas, using water and a raw material. The raw material contains at least an organic compound composed of carbon and hydrogen and is exemplified by hydrocarbon-based components such as natural gas (mainly containing methane) and propane gas; alcohol such as methanol; and naphtha components. The feed rate of the raw material to the reformer 2 is controlled by a raw material feeder 10 (described later) that serves as one example of the raw material feeder of the invention. Cutoff/start of a supply of the raw material to the reformer 2 is carried out by an on-off valve 7a. Although not particularly shown in FIG. 1, the fuel gas generator includes a reformer for promoting the steam reforming reaction and a shift converter and purifier for reducing carbon monoxide contained in the fuel gas discharged from the reformer.

The reformer has a reforming catalyst (not particularly shown in FIG. 1) for promoting the steam reforming reaction; a combustion burner 2a for combusting off gas discharged, for instance, from the fuel cell 1 in order to heat the reforming catalyst; and a combustion fan 2b for feeding air necessary for the combustion of the off gas etc. within the combustion burner 2a from the atmosphere. The combustion burner 2a combusts at least any of combustion fuels which are the off gas discharged from the fuel cell 1, the fuel gas generated in the fuel gas generator and the raw material fed from the raw material feeder 10. Thereby, heat energy for heating the reforming catalyst of the reformer is generated.

The shift converter includes a shift catalyst for reducing the carbon monoxide concentration of the fuel gas discharged from the reformer through the reaction with water. The purifier includes a CO removal catalyst for further reducing the carbon monoxide concentration of the fuel gas discharged from the shift converter through an oxidation reaction or methanation reaction. The shift converter and the purifier are respectively operated under the temperature conditions respectively suited for the chemical reactions proceeding therein in order to effectively reduce carbon monoxide contained in the fuel gas.

A detailed explanation of other components of the fuel gas generator than the above-described reformer, shift converter and purifier is omitted herein because the inner configuration of the fuel gas generator is the same as of commonly-used reformers.

As shown in FIG. 1, the fuel cell system 100 includes the raw material feeder 10. The raw material feeder 10 is a booster pump for raising the pressure of the raw material such as natural gas supplied form natural gas infrastructure or the like during the power generating operation of the fuel cell system 100 and feeds the raw material to the reformer 2 through the above-mentioned on-off valve 7a. Herein, the output of the raw material feeder 10 is controlled by a controller 101 (described later) so that the feed rate of the raw material to the reformer 2 can be properly adjusted according to need.

As shown in FIG. 1, the fuel cell system 100 includes the blower 3. The blower 3 suctions air from the atmosphere to supply air to the oxidizing gas flow path 1b of the fuel cell 1 as the oxidizing gas. As the blower 3, a sirocco fan or the like is suitably used.

As shown in FIG. 1, the fuel cell system 100 includes a heat exchanger 4. The heat exchanger 4 exchanges heat between the temperature-risen cooling water which has been discharged from a cooling water flow path (not particularly shown in FIG. 1) of the fuel cell 1 by the operation of a pump 6a and the water fed from the hot water storage tank 5 (described later) by a pump 6b for hot water supply, or the like. The cooling water which has been cooled by the heat exchange in the heat exchanger 4 is again fed to the cooling water flow path of the fuel cell 1 by the operation of the pump 6a.

As shown in FIG. 1, the fuel cell system 100 includes the hot water storage tank 5. The hot water storage tank 5 stores the water heated by the heat exchanger 4. Herein, the water stored in the hot water storage tank 5 is circulated through the heat exchanger 4 by the operation of the pump 6b. At that time, in the heat exchanger 4, the water supplied from the hot water storage tank 5 is heated by the heat of the temperature-risen cooling water which has been discharged from the fuel cell 1 by the operation of the pump 6a. The water heated by the heat exchanger 4 is stored in the hot water storage tank 5. The heated water stored in the hot water storage tank 5 is used for hot water supply according to need.

As illustrated in FIG. 1, the fuel cell system 100 is provided with a three-way valve 8 located in the junction between a first route R1 and a fourth route R4 through which the fuel gas generated in the fuel gas generator is fed to the fuel gas flow path 1a of the fuel cell 1. An on-off valve 7b is provided in an intermediate location of a fifth route 5 through which the off gas discharged from the fuel gas flow path 1a of the fuel cell 1 is fed to the combustion burner 2a of the reformer 2. Provided between the three-way valve 8 and the junction between the fifth route R5 and the third route R3 is a second route R2 (bypass route) that allows the fuel gas generated in the fuel gas generator to be directly fed to the combustion burner 2a, so as to bypass the fuel cell 1. As illustrated in FIG. 1, the first route R1, the second route R2 and the third route R3 constitute a first fuel gas passage A. As illustrated in FIG. 1, the first route R1, the fourth route R4, the fuel gas flow path 1a, the fifth route R5 and the third route R3 constitute a second fuel gas passage B. That is, the fuel cell system 100 of the first embodiment is configured to directly feed the fuel gas discharged from the fuel gas generator to the combustion burner 2a without passing it to the fuel cell 1 according to need, by operating the on-off valve 7b and the three-way valve 8. In this embodiment, the first route R1 and the fourth route R4 constitute a fuel gas passage for feeding the fuel gas generated in the fuel gas generator to the fuel gas flow path 1a of the fuel cell 1. The fifth route R5 and the third route R3 constitute an off gas passage through which the off gas discharged from the fuel gas flow path 1a of the fuel cell 1 is fed to the combustion burner 2a of the reformer 2.

The fuel cell system 100 further includes the controller 101. The controller 101 properly controls the operations of the components of the fuel cell system 100. Although not particularly shown in FIG. 1, this controller 101 includes, for example, a memory, a timer, a central processing unit (CPU) and others. Programs for the respective operations of the components of the fuel cell system 100 are prestored in the memory of the controller 101 and the controller 101 properly controls the operation of the fuel cell system 100 according to the programs stored in the memory.

Next, the operation of the fuel cell system 100 according to the first embodiment of the invention will be described in detail with reference to the drawings.

In the following description, it is assumed that during the shutdown operation or start-up operation of the fuel cell system 100, the fuel gas flow path 1a of the fuel cell system 100 and its surrounding area are filled with a raw material beforehand, the raw material (natural gas, which is hydrocarbon gas, is employed in the first embodiment) serving as a substitution gas and containing at least an organic compound composed of carbon and hydrogen. Filling the fuel cell 1 etc. with the raw material is done by feeding the raw material from the raw material feeder 10 shown in FIG. 1 to the fuel cell 1 etc. In this embodiment, the term "during the start-up operation" means "the time period after the controller 101 has output a start-up command until a current is taken out from the fuel cell 1 by a power generation controller (not particularly shown in FIG. 1) of the fuel cell 1", and the term "during the shutdown operation" means "the time period after the controller 101 has output a shutdown command until the operation of the whole fuel cell system 100 completely stops".

In the fuel cell system 100, the following operation is performed through the control by the controller 101.

First, when starting the power generating operation of the fuel cell system 100 shown in FIG. 1, the fuel gas generator is put in operation in order to generate the hydrogen-rich fuel gas necessary for the power generating operation of the fuel cell 1. Specifically, natural gas that is the raw material used for generation of hydrogen is supplied to the reformer 2 by the raw material feeder 10 shown in FIG. 1. To generate steam to be used for promoting the steam reforming reaction, water is supplied to the reformer 2 from an infrastructure such as a water line. To promote the stream reforming reaction in the reformer 2, a reforming catalyst provided in the reformer 2 is heated by the combustion burner 2a.

For a short period just after the start of the power generating operation of the fuel cell system 100, the reforming catalyst of the reformer 2 is heated by the combustion burner 2a so as to gradually raise its temperature, but the temperature of the reforming catalyst has not reached a specified value yet. Therefore, the steam reforming reaction in the reformer 2 does not suitably proceed and the fuel gas containing a large amount of carbon monoxide is discharged from the fuel cell gas generator. In view of this, this embodiment is configured as follows: After the start of the power generating operation of the fuel cell system 100 until the temperature of the reforming catalyst of the reformer 2 reaches the specified temperature, so that generation of the fuel gas of good quality becomes possible (i.e., a specified operating condition is satisfied), the controller 101 controls the three-way valve 8 to connect the first route R1 and the second route R2 to each other and brings the on-off valve into a closed state so that the first route R1, the second route R2 and the third route R3 establish the first fuel gas passage A. The fuel gas containing a high concentration of carbon monoxide generated in the fuel gas generator is sent to the first fuel gas passage A. Thereby, the fuel gas containing a high concentration of carbon monoxide is supplied to the combustion burner 2a through the first fuel gas passage A. Then, the combustion burner 2a combusts the supplied fuel gas containing a high concentration of carbon monoxide, thereby heating the reforming catalyst of the reformer 2. In doing so, the temperature of the reforming catalyst rises to the specified value. It should be noted that the fuel gas combusted by the combustion burner 2a is discharged outside the fuel cell system 100 as exhaust gas.

To combust the fuel gas containing a high concentration of carbon monoxide in the combustion burner 2a, the combustion fan 2b supplies air to the combustion burner 2a. The feed rate of air supplied from the combustion fan 2b to the combustion burner 2a is properly set in accordance with the feed rate of the raw material such as natural gas supplied from the raw material feeder 10 to the reformer 2.

More concretely, in theory, the reformer 2 generates hydrogen from natural gas through the chemical reaction represented by Formula (1) after the start of the power generating operation of the fuel cell system 100. Herein, where the feed rate of the natural gas supplied to the reformer 2 by the raw material feeder 10 is designated by Q (L/min.) for convenience sake, the emission of hydrogen from the fuel gas generator is 4Q (L/min.) according to the chemical reaction of Formula (1). In this embodiment, in order to perfectly combust hydrogen fed from the fuel cell generator to the combustion burner 2a at the rate of 4Q (L/min.) through the first fuel gas passage A, oxygen is supplied from the combustion fan 2b to the combustion burner 2a at a rate of 2Q (L/min.), thereby promoting the combustion reaction represented by Formula (2). At that time, the controller 101 controls the rotational speed of the combustion fan 2b so as to make the feed rate of oxygen to the combustion burner 2a equal to 2Q (L/min.).

$$CH_4 + 2H_2O \rightarrow CO_2 + 4H_2 \quad (1)$$

$$4H_2 + 2O_2 \rightarrow 4H_2O \quad (2)$$

That is, in this embodiment, the feed rate of air supplied from the combustion fan 2b to the combustion burner 2a is set based on the amount of hydrogen theoretically generated by the reformer 2, i.e., the feed rate of the natural gas supplied from the raw material feeder 10 to the reformer 2. Thereby, the fuel gas containing a high concentration of carbon monoxide can be combusted by the combustion burner 2a. And, the reforming catalyst of the reformer 2 is heated by the heat energy generated in the combustion burner 2a.

The subsequent operation will be described in detail with reference to FIG. 2 to more concretely explain the invention.

Figure 2:
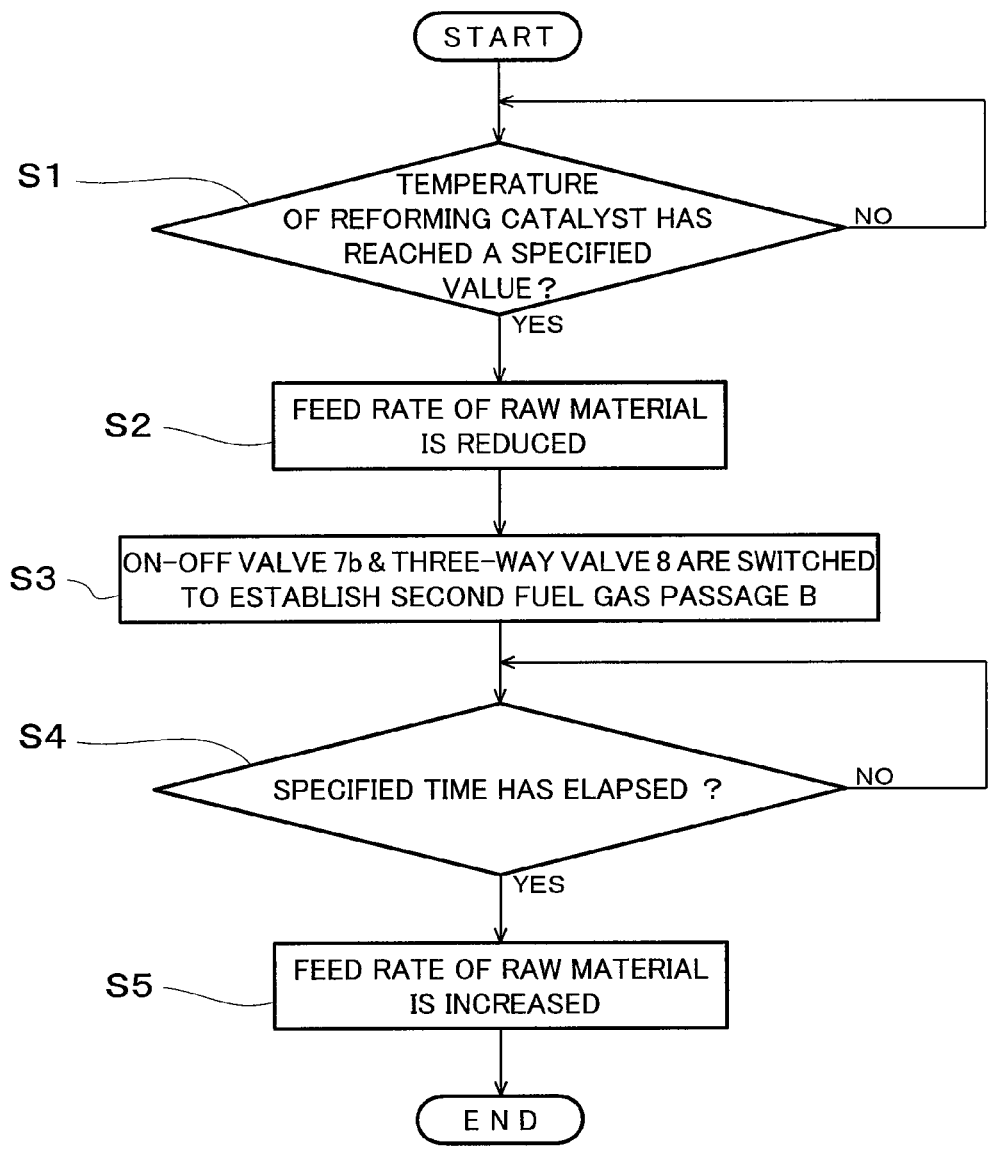
FIG. 2 is a flow chart that schematically shows part of the operation of the fuel cell system according to the first embodiment of the invention.

FIG. 2 is a flow chart that schematically shows part of the operation of the fuel cell system according to the first embodiment of the invention.

As shown in FIG. 2, after the reforming catalyst of the reformer 2 has risen in temperature owing to the heat generated from the combustion of the fuel gas containing a high concentration of carbon monoxide in the combustion burner 2a, the controller 101 determines whether or not the temperature of the reforming catalyst has reached the specified temperature suited for the steam reforming reaction (Step S1). Herein, the temperature of the reforming catalyst is detected by, for example, a temperature sensor embedded in the reforming catalyst. The output signal of the temperature sensor is input to the controller 101. Then, the controller 101 analyses the output signal, thereby recognizing the temperature of the reforming catalyst. If it is determined that the temperature of the reforming catalyst has not reached the specified temperature ("NO" at Step S1), heating of the reforming catalyst by the combustion burner 2a will be continued until it is determined that the temperature of the reforming catalyst has reached the specified temperature.

If the controller 101 determines at Step S1 that the temperature of the reforming catalyst has reached the specified temperature ("YES" at Step S1), the controller 101 then controls the raw material feeder 10 to reduce the feed rate of the raw material to the reformer 2 while maintaining the volume of air sent from the combustion fan 2b (Step S2).

More concretely, the feed rate of the natural gas, which is supplied to the combustion burner 2a after being discharged (forced out) from the fuel gas flow path 1a etc. of the fuel cell 1 subsequently to Step S3 (described later), is approximately equal to the feed rate of the fuel gas supplied from the fuel gas generator to the fuel gas flow path 1a. For example, according to Formula (1), when the feed rate of the natural gas to the reformer 2 is Q (L/min.), the fuel gas generator discharges carbon dioxide at a rate of Q (L/min.) and hydrogen at a rate of 4Q (L/min.). Therefore, natural gas is supplied from the fuel gas flow path 1a etc. of the fuel cell 1 to the combustion burner 2a at a rate of 5Q (L/min.).

To completely combust the natural gas supplied at a rate of 5Q (L/min.) thereby converting the natural gas into carbon dioxide and water as represented by Formula (3), it is necessary to supply oxygen to the combustion burner 2a at a rate of 10Q (L/min.). However, at the start of the power generating operation of the fuel cell system 100, the feed rate of oxygen supplied to the combustion burner 2a is 2Q (L/min.) depending on the feed rate of the natural gas supplied to the reformer 2, as discussed earlier. Therefore, incomplete combustion of the supplied natural gas proceeds in the combustion burner 2a, which causes carbon monoxide emission from the fuel cell system 100.

$$5CH_4 + 10O_2 \rightarrow 5CO_2 + 10H_2O \quad (3)$$

In this embodiment, for complete combustion of the natural gas discharged from the fuel gas flow path 1a etc. of the fuel cell 1 and supplied to the combustion burner 2a, the feed rate of the raw material to the reformer 2 is properly reduced by the raw material feeder 10 at step S2 before the establishment of the second fuel gas passage B by controlling the on-off valve 7b and the three-way valve 8 at step S3. In this way, the amount of natural gas, which is forced out of the fuel gas flow path 1a etc. of the fuel cell 1 and supplied to the combustion burner 2a in the case where the second fuel gas passage B is established, is properly reduced to the value corresponding to the amount of oxygen supplied at a rate of 2Q (L/min.).

In this embodiment, the feed rate of the raw material supplied from the raw material generator 10 to the reformer 2 is reduced to about ⅕ (about 2/10) according to Formula (3). Therefore, the feed rate of the natural gas supplied to the combustion burner 2a becomes Q (L/min.). Therefore, even if the feed rate of oxygen supplied from the combustion fan 2b to the combustion burner 2a is kept to 2Q (L/min.), the natural gas supplied at a rate of Q (L/min.) can be substantially completely combusted in the combustion burner 2a so that the carbon monoxide emission to the outside of the fuel cell system 100 is suppressed.

In other words, in this embodiment, the controller 101 properly controls the operation of the raw material feeder 10 so as to reduce the feed rate of natural gas to the combustion burner 2a while keeping the feed rate of air supplied from the combustion fan 2b to the combustion burner 2a, so that an air ratio of 1 or more is satisfied. "The air ratio" stated herein means the ratio of the actual amount of air to the theoretical amount of air necessary for complete combustion of the combustion fuel.

Herein, the feed rate of the raw material supplied to the reformer 2 may be reduced by the raw material feeder 10 in any patterns.

Figure 3A:
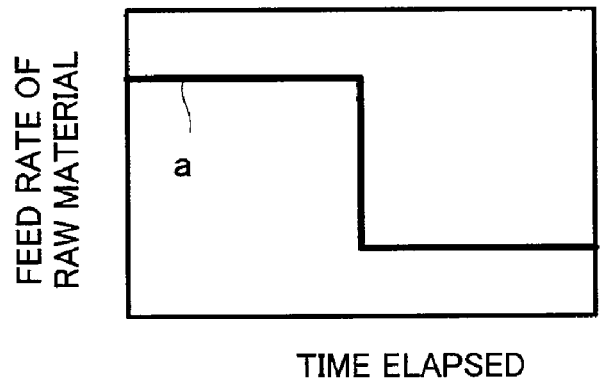
FIG. 3(a) shows a case where the feed rate of the raw material is reduced by one step.
Figure 3B:
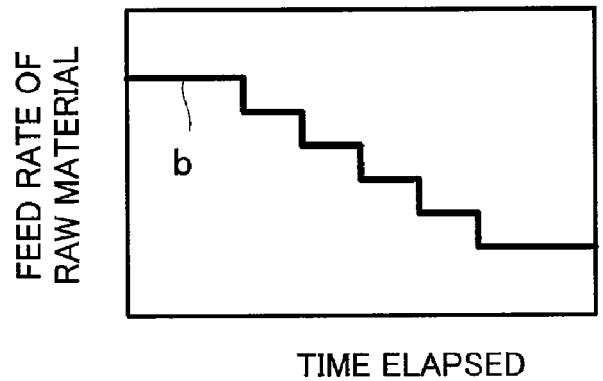
FIG. 3(b) shows a case where the feed rate of the raw material is reduced in a stepwise fashion.
Figure 3C:
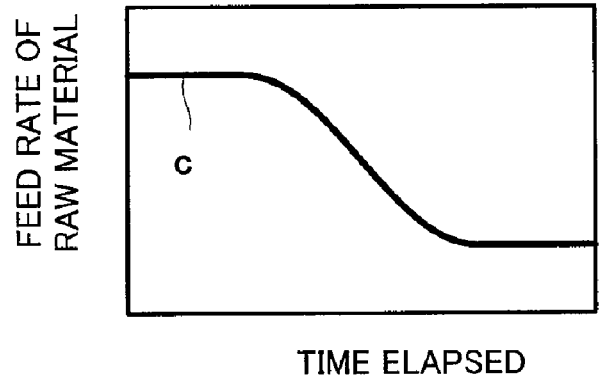
FIG. 3(c) shows a case where the feed rate of the raw material is gradually reduced.

FIG. 3 is diagrams each schematically showing a reduction pattern for the feed rate of the raw material supplied from the raw material feeder 10 to the reformer 2. In FIGS. 3(a) to 3(c), the feed rate of the raw material to the reformer 2 which feed rate is controlled by the raw material feeder 10 is plotted on the ordinate whereas the time elapsed is plotted on the abscissa.

As shown in FIG. 3, at Step S2 shown in FIG. 2, the feed rate of the raw material supplied from the raw material feeder 10 to the reformer 2 may be reduced by one step as indicated by the curve a shown in FIG. 3(a) or may be reduced in a stepwise fashion as indicated by the curve b shown in FIG. 3(b). Alternatively, it may be gradually reduced as indicated by the curve c shown in FIG. 3(c). With any of the reduction patterns of FIGS. 3(a) to 3(c), incomplete combustion of natural gas in the combustion burner 2a can be effectively suppressed.

After the feed rate of the raw material supplied to the reformer 2 is reduced by the raw material feeder 10 at Step S2, the controller 101 controls the three-way valve 8 and the on-off valve 7b to establish the second fuel gas passage B by the first route R1, the fourth route R4, the fuel gas flow path 1a, the fifth route R5 and the third route R3 (Step S3).

By this time, the temperature of the reforming catalyst in the reformer 2 has reached a specified value which enables adequate progression of the steam reforming reaction, so that the fuel gas generator discharges the fuel gas containing a sufficiently reduced amount of carbon monoxide. Then, the fuel gas generated in the fuel gas generator and containing a sufficiently reduced amount of carbon monoxide is supplied to the fuel gas flow path 1a etc. of the fuel cell 1 by way of the first route R1 and the fourth route R4. Owing to the fuel gas supplied from the fuel gas generator to the fuel gas flow path 1a etc. of the fuel cell 1, the natural gas, which has been introduced into the fuel gas flow path 1a of the fuel cell 1 and its surrounding area as a substitution gas, is forced out. This natural gas is supplied to the combustion burner 2a by way of the fifth route R5 and the third route R3.

In the combustion burner 2a, the natural gas forced out of the fuel gas flow path 1a etc. of the fuel cell 1 is combusted with air fed from the combustion fan 2b. At that time, the amount of oxygen required for complete combustion of the raw material (natural gas) is supplied from the combustion fan 2b by reducing the feed rate of the raw material to the reformer 2 as described earlier, and therefore the natural gas is completely combusted in the combustion burner 2a. In this way, carbon monoxide emission to the outside of the fuel cell system 100 is suppressed.

After the feed rate of the raw material to the reformer 2 is reduced by the raw material feeder 10 to reduce the feed rate of the natural gas to the combustion burner 21, the whole amount of natural gas is discharged from the fuel gas flow path 1a etc. of the fuel cell 1. If the timer of the controller 101 determines that a specified time required for combusting the whole amount of natural gas in the combustion burner 2a has elapsed ("YES" at Step S4), the feed rate of the raw material to the reformer 2 is increased by the raw material feeder 10 (Step S5).

More specifically, the controller 101 controls the operation of the flow rate control section of the raw material feeder 10 in order that the feed rate of the raw material supplied from the raw material feeder 10 to the reformer 2 is changed from ⅕Q (L/min.) to 2Q (L/min.), thereby restoring the raw material feed rate before reduction. At Step S5 and later steps, the combustion burner 2a combusts the off gas discharged from the fuel gas flow path 1a of the fuel cell 1, so that the reforming catalyst of the reformer 2 is kept at the specified temperature that enables progression of the steam reforming reaction.

"The specified time" determined to be "YES" at step S4 is defined as T (min.) that is calculated from Formula (4) where the sum of the volumetric capacities of the fuel gas flow path 1a of the fuel cell 1, the fifth route R5 and the third route R3 is denoted by V(L) and the feed rate of the natural gas to the combustion burner 2a is denoted by X(L/min.).

$$T \geq V/X \tag{4}$$

At Step S3 and later steps, the fuel gas is supplied from the fuel gas generator to the fuel cell 1 so that the fuel cell 1 starts a power generating operation in the following way.

Specifically, after the fuel gas whose carbon monoxide concentration has been sufficiently reduced is supplied from the fuel gas generator to the fuel gas flow path 1a of the fuel cell 1 and air is supplied from the blower 3 to the oxidizing gas flow path 1b of the fuel cell 1, power generation is performed in the fuel cell 1, using the fuel gas and air supplied to the anode side and cathode side thereof to output a specified amount of electric power. The off gas, which has not been used for power generation, is discharged from the fuel gas flow path 1a of the fuel cell 1 and then supplied to the combustion burner 2a by way of the fifth route R5 and the third route R3. Then, the off gas is combusted in the combustion burner 2a, for promoting the steam reforming reaction. The air discharged from the oxidizing gas flow path 1b of the fuel cell 1 is discharged outside the fuel cell system 100.

During the power generating operation, the fuel cell 1 generates heat through the electrochemical reaction for power generation. The heat generated in the fuel cell 1 is successively retrieved by cooling water that is circulated, by the pump 6a, in the cooling water flow path (not particularly shown in FIG. 1) formed in the fuel cell 1. The heat, retrieved by the cooling water circulated by the pump 6a, is utilized within the heat exchanger 4 to heat the water circulated by the pump 6b from the hot water storage tank 5.

Although the first embodiment has been described with a case where natural gas is used as the raw material for generating the fuel gas and the fuel gas flow path 1a of the fuel cell 1 and its surrounding area are preliminarily filled with natural gas serving as a substitution gas, the invention is not necessarily limited to this. Alternatively, propane gas may be used as the raw material for generating the fuel gas and the fuel gas flow path 1a of the fuel cell 1 may be preliminarily filled with propane gas serving as a substitution gas.

In this case, in the reformer 2, hydrogen is generated from propane gas and water through the chemical reaction represented by Formula (5). If the feed rate of propane gas supplied from the raw material feeder 10 to the reformer 2 is Q (L/min.), the emission of hydrogen from the fuel gas generator is 10Q (L/min.) according to the chemical reaction represented by Formula (5). For complete combustion of hydrogen supplied to the combustion burner 2a at a rate of 10Q (L/min.), oxygen may be supplied at a rate of 5Q (L/min.) based on Formula (6). In doing so, the controller 101 controls the rotational speed of the combustion fan 2b such that the feed rate of oxygen to the combustion burner 2a becomes 5Q (L/min.).

In the above case, if Step S3 shown in FIG. 2 is executed and the second fuel gas passage B is established by controlling the on-off valve 7b and the three-way valve 8, it becomes necessary to supply oxygen at a rate of 65Q (L/min.) based on Formula (7), for complete combustion of the propane gas supplied to the combustion burner 2a at a rate of 13Q (L/min.). To this end, the feed rate of the propane gas to the reformer 2 is reduced by the raw material feeder 10 at Step S2 prior to the establishment of the second fuel gas passage B by controlling the on-off valve 7*b* and the three-way valve 8 at Step S3 of FIG. 2, whereby the feed rate of the propane gas to the combustion burner 2*a* is reduced. More concretely, the feed rate of the propane gas supplied from the raw material feeder 10 to the reformer 2 is reduced to about $1/13$ (about $5/65$), thereby reducing the feed rate of the propane gas to the combustion burner 2*a* to about $1/13$.

$$13C_3H_8 + 65O_2 \rightarrow 39CO_2 + 42H_2O \qquad (7)$$

As should appreciated, a technical feature of the invention is that the feed rate of the raw material to the reformer 2 is reduced by the raw material feeder 10 for a specified period of time depending on the type of substitution gas introduced into the fuel cell 1.

Although the first embodiment has been described with a case where the feed rate of the raw material to the reformer 2 is reduced by the raw material feeder 10 before the establishment of the second fuel gas passage B, the invention is not limited to this. Alternatively, the feed rate of the raw material to the reformer 2 could be reduced by the raw material feeder 10 after or at the same time with the establishment of the second fuel gas passage B. With this modification, the same effect as of the first embodiment can be obtained. In the case where the feed rate of the raw material to the reformer 2 is reduced after the establishment of the second fuel gas passage B, the reduction should be done by the raw material feeder 10 before the natural gas forced out of the fuel cell 1 etc. is supplied to the combustion burner 2*a* by way of the fifth route R5 and the third route R3.

Although the first embodiment has been described with a case where the temperature of the reforming catalyst is detected at Step S1 of FIG. 2, the invention is not necessarily limited to this but is equally applicable to a case where the operating temperature of at least any one of the components, i.e., the reformer, shift converter and purifier of the fuel gas generator is detected. With this modification, the same effect as of the first embodiment can be obtained.

Although the fuel cell system 100 has a solid polymer electrolyte fuel cell as the fuel cell 1 in the first embodiment, the fuel cell 1 is not limited to this but could be a phosphoric-acid fuel cell, an alkaline fuel cell, etc. With this modification, the same effect as of the first embodiment can be obtained.

Second Embodiment

Figure 4:
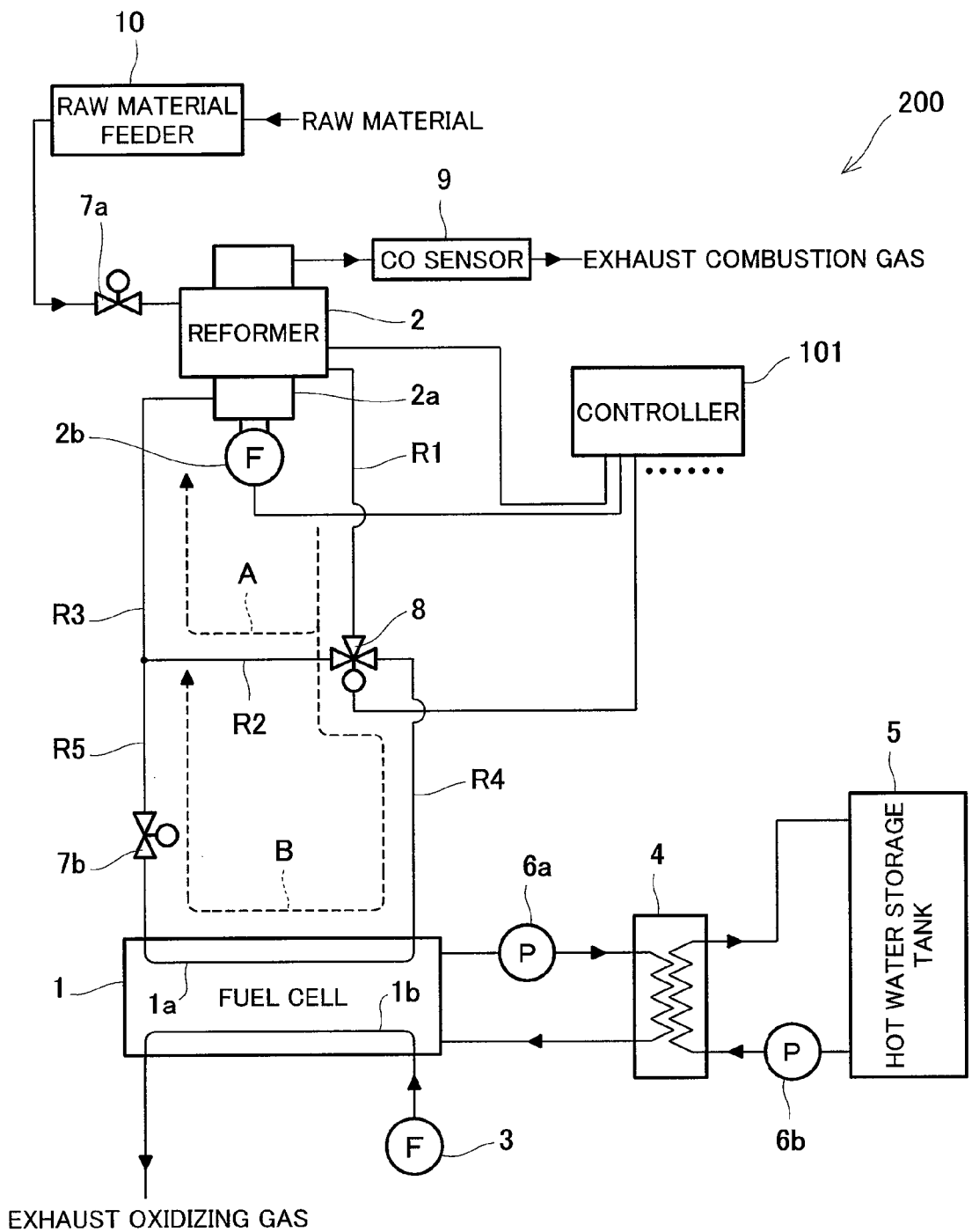
FIG. 4 is a block diagram that schematically shows a configuration of a fuel cell system according to a second embodiment of the invention.

FIG. 4 is a block diagram that schematically shows a configuration of a fuel cell system according to a second embodiment of the invention. In FIG. 4, the solid lines connecting the components of the fuel cell system represent the passages where water, fuel gas, oxidizing gas and the like flow respectively. The arrows on the solid lines indicate the flowing directions of the water, fuel gas, oxidizing gas etc. respectively when the fuel cell system is in normal operation. It should be noted that FIG. 4 shows only the components necessary for describing the invention and other components are omitted from FIG. 4. In FIG. 4, the same components as of the fuel cell system 100 of the first embodiment are identified by the same reference numerals as in the first embodiment.

As illustrated in FIG. 4, a fuel cell system 200 according to this embodiment has substantially the same configuration as of the fuel cell system 100 of the first embodiment. The fuel cell system 200 of this embodiment differs from the fuel cell system 100 of the first embodiment in that the fuel cell system 200 has a CO sensor 9. Except this, the configuration of the fuel cell system 200 is the same as of the fuel cell system 100 of the first embodiment.

As stated above, the fuel cell system 200 of the second embodiment has a CO sensor 9. The CO sensor 9 outputs, as a change in electric signal, a change in the carbon monoxide concentration of the exhaust combustion gas released from the combustion burner 2*a*. The controller 101 analyzes the electric signal output from the CO sensor 9 to detect, for instance, a change in the carbon monoxide concentration of the exhaust combustion gas. In this embodiment, the determination on "a specified period of time" at Step S4 of FIG. 2 is replaced by the process in which if the controller 101 determines that the carbon monoxide concentration of the exhaust combustion gas released from the combustion burner 2*a* has become equal to or lower than "a specified threshold concentration", the output of the raw material feeder 10 is controlled so as to increase the feed rate of the raw material to the reformer 2.

More specifically, when the natural gas that has filled the fuel gas flow path 1*a* of the fuel cell 1 and its surrounding area is combusted in the combustion burner 2*a*, carbon dioxide and water are generated as chief products as indicated by Formula (3) whereas a slight amount of carbon monoxide is generated in case of incomplete combustion. In this embodiment, if the carbon monoxide concentration of the exhaust combustion gas detected by the CO sensor 9 drops from, for example, 10 ppm to a value equal to or lower than a specified threshold concentration (3 ppm), the feed rate of the raw material to the reformer 2 is increased by the raw material feeder 10.

Figure 5:
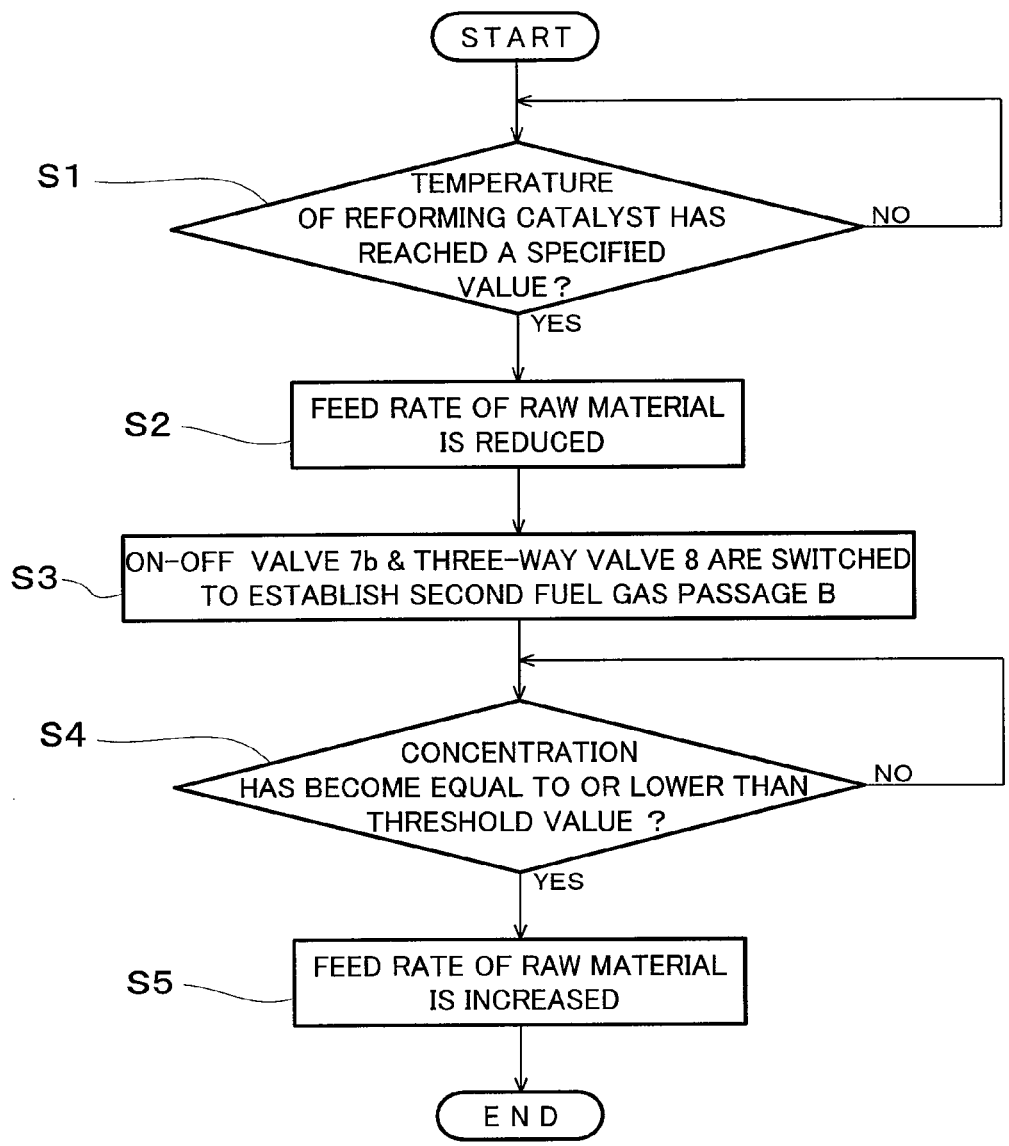
FIG. 5 is a flow chart that schematically shows part of the operation of the fuel cell system according to the second embodiment of the invention.

FIG. 5 is a flow chart that schematically shows part of the operation of the fuel cell system according to the second embodiment of the invention.

As shown in FIG. 5, in the second embodiment, if it is determined that the temperature of the reforming catalyst of the reformer 2 has reached a specified value ("YES" at Step S1), the controller 101 controls the raw material feeder 10 so as to reduce the feed rate of the raw material to the reformer 2, similarly to the first embodiment (Step S2). Thereafter, the controller 101 controls the on-off valve 7*b* and the three-way valve 8 to establish the second fuel gas passage B by the first route R1, the fourth route R4, the fuel gas flow path 1*a*, the fifth route R5 and the third route R3 (Step S3). In this embodiment, as shown in FIG. 5, if it is determined that the carbon monoxide concentration of the exhaust combustion gas released from the combustion burner 2*a* has become equal to or lower than "the specified threshold concentration" ("YES" at Step S4), the controller 101 controls the raw material feeder 10 so as to increase the feed rate of the raw material to the reformer 2 (Step S5).

With the above configuration, the feed rate of the raw material to the reformer 2 can be increased by the raw material feeder 10 after the carbon monoxide concentration of the exhaust combustion gas has become equal to or lower than the specified threshold concentration and the combustion of the natural gas serving as a substitution gas has determined to be completed.

Although the second embodiment has been described with a case where the feed rate of the raw material to the reformer 2 is increased by the raw material feeder 10 based on the carbon monoxide concentration of the exhaust combustion gas released from the combustion burner 2*a*, the invention is not limited to this. For example, the feed rate of the raw material to the reformer 2 could be increased by the raw material feeder 10 based on the output value of an electric signal released from the CO sensor 9 instead of the carbon monoxide concentration of the exhaust combustion gas released from the combustion burner 2*a*.

More concretely, in the fuel cell system 200 of the second embodiment, when the CO sensor 9 outputs a change in the carbon monoxide concentration of the exhaust combustion gas released from the combustion burner 2a to the controller 101 as a change in electric signal, the controller 101 detects the output value (e.g., voltage value) of the electric signal released from the CO sensor 9. Then, if the controller 101 determines that the output value from the CO sensor 9 indicative of the carbon monoxide concentration of the exhaust combustion gas discharged from the combustion burner 2a has become equal to or lower than "a specified output value", instead of the determination based on the "specified period of time" at step S4 in FIG. 2 or the determination based on the "specified threshold concentration" at step S4 in FIG. 5, the feed rate of the raw material to the reformer 2 is increased by the raw material feeder 10. This configuration enables it to eliminate the need for calculation of the carbon monoxide concentration of the exhaust combustion gas discharged from the combustion burner 2a by the controller 101, and therefore the programs prestored in the memory of the controller 101 can be simplified.

The second embodiment does not differ from the first embodiment except the above point.

Third Embodiment

In the first and second embodiments, the one-step reduction pattern, the stepwise reduction pattern and the gradual reduction pattern are shown as the reduction patterns for the feed rate of the raw material supplied from the raw material feeder 10 to the reformer 2. For ideal combustion reaction in the combustion burner 2a, a more desirable pattern is such that the reduction of the feed rate of the raw material supplied from the raw material feeder 10 to the reformer 2 is carried out in accordance with the composition of the combustion fuel supplied to the combustion burner 2a to prevent occurrence of accidental fire or incomplete combustion in the combustion burner 2a.

Instead of the patterns configured to simply reduce the feed rate of the raw material to the reformer 2 by the raw material feeder 10, the following pattern is preferably employed: When the three-way valve 8, which is the switching means of the invention, changes the destination of the fuel gas generated in the reformer 2 from the second route R2 to the fuel cell 1, the composition (that is, in fact, the composition ratio of hydrogen and natural gas) of the combustion fuel supplied to the combustion burner 2a is successively detected by a specified detecting means, and in accordance with the result of the detection, the feed rate of the raw material to the reformer 2 is properly reduced by the raw material feeder 10. If either the hydrogen concentration or the raw material concentration in the off gas routes R3, R5 or the combustion burner 2a of the invention is detected, the other concentration is predictable. Therefore, in this embodiment, the combustion burner 2a is provided with a flame-rod type flame sensor 11 as the raw material concentration detector of the invention, and if the raw material concentration detected by the flame sensor 11 increases, the feed rate of the combustion fuel (raw material) to the combustion burner 2a is reduced. The details will be described below.

Figure 6:
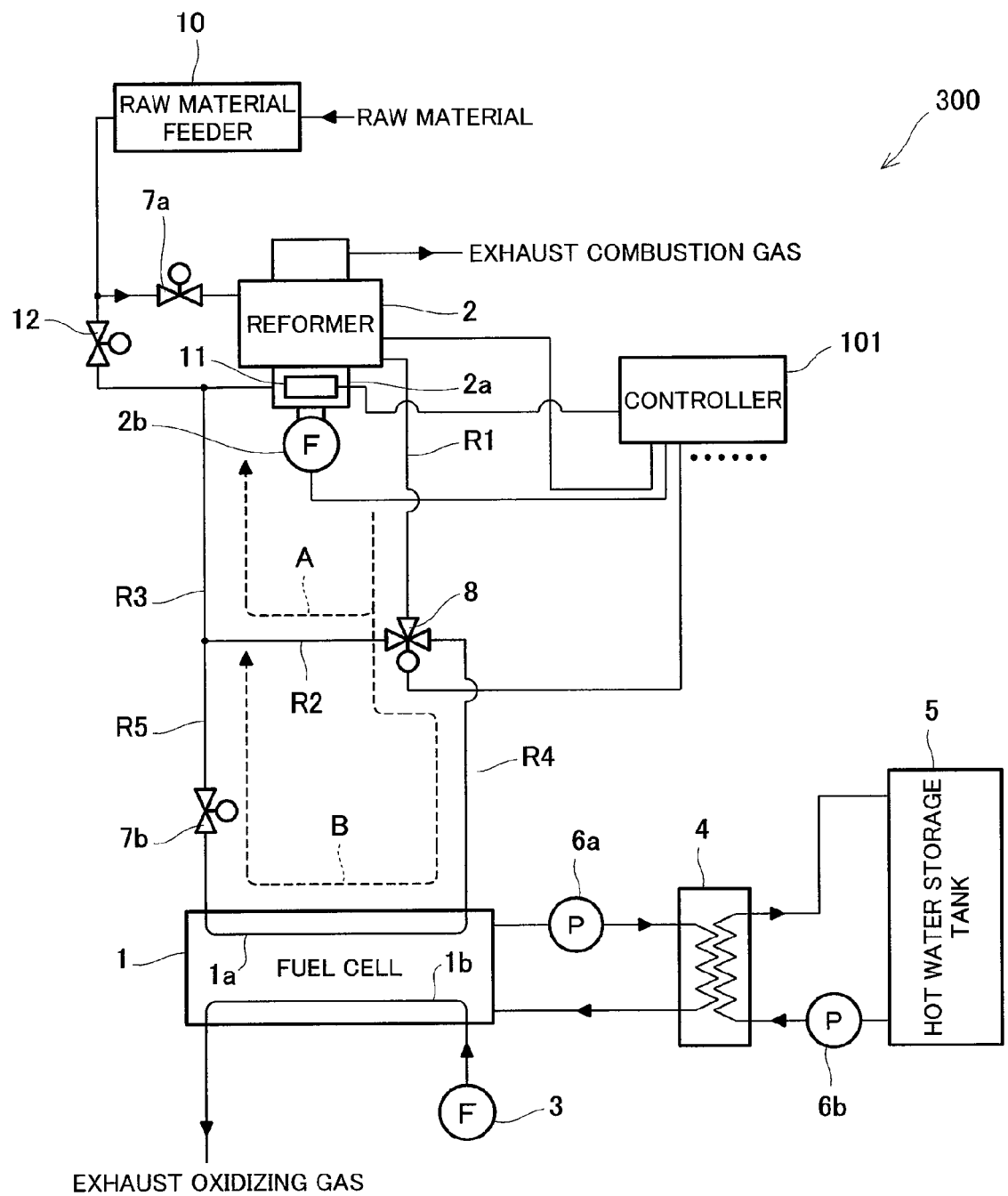
FIG. 6 is a block diagram that schematically shows a configuration of a fuel cell system according to a third embodiment of the invention.

FIG. 6 is a block diagram that schematically shows a configuration of a fuel cell system according to a third embodiment of the invention. In FIG. 6, the solid lines connecting the components of the fuel cell system represent the passages where water, fuel gas, oxidizing gas and the like flow respectively. The arrows on the solid lines indicate the flowing directions of the water, fuel gas, oxidizing gas etc. respectively when the fuel cell system is in normal operation. It should be noted that FIG. 6 shows only the components necessary for describing the invention and other components are omitted from FIG. 6. In FIG. 6, the same components as of the fuel cell system 100 of the first embodiment are identified by the same reference numerals as in the first embodiment.

As illustrated in FIG. 6, a fuel cell system 300 according to this embodiment has substantially the same configuration as of the fuel cell system 100 of the first embodiment.

The configuration of the fuel cell system 300 of this embodiment differs from that of the fuel cell system 100 of the first embodiment in that the fuel cell system 300 has the flame-rod type flame sensor 11 provided within the combustion burner 2a as the raw material concentration detector of the invention. In addition, the configuration of the fuel cell system 300 differs from that of the fuel cell system 100 of the first embodiment in that the fuel cell system 300 has a flow rate control valve 12 and the raw material feeder 10 is able to feed the raw material to the combustion burner 2a through the flow rate control valve 12. Except these points, the configuration of the fuel cell system 300 is the same as of the fuel cell system 100 of the first embodiment.

As just stated, the fuel cell system 300 of the third embodiment includes the flame sensor 11. The flame sensor 11 detects an ion current generated when hydrocarbon contained in the raw material is combusted in the combustion burner 2a and outputs an electric signal indicative of the magnitude of the ion current to the controller 101. The controller 101 analyses the electric signal output from the flame sensor 11, thereby detecting the raw material concentration of the gas supplied to the combustion burner 2a and, therefore, the composition of the combustion fuel. In this embodiment, the raw material feeder 10 properly reduces the feed rate of the raw material to the reformer 2 according to the detected composition of the combustion fuel.

Figure 7:
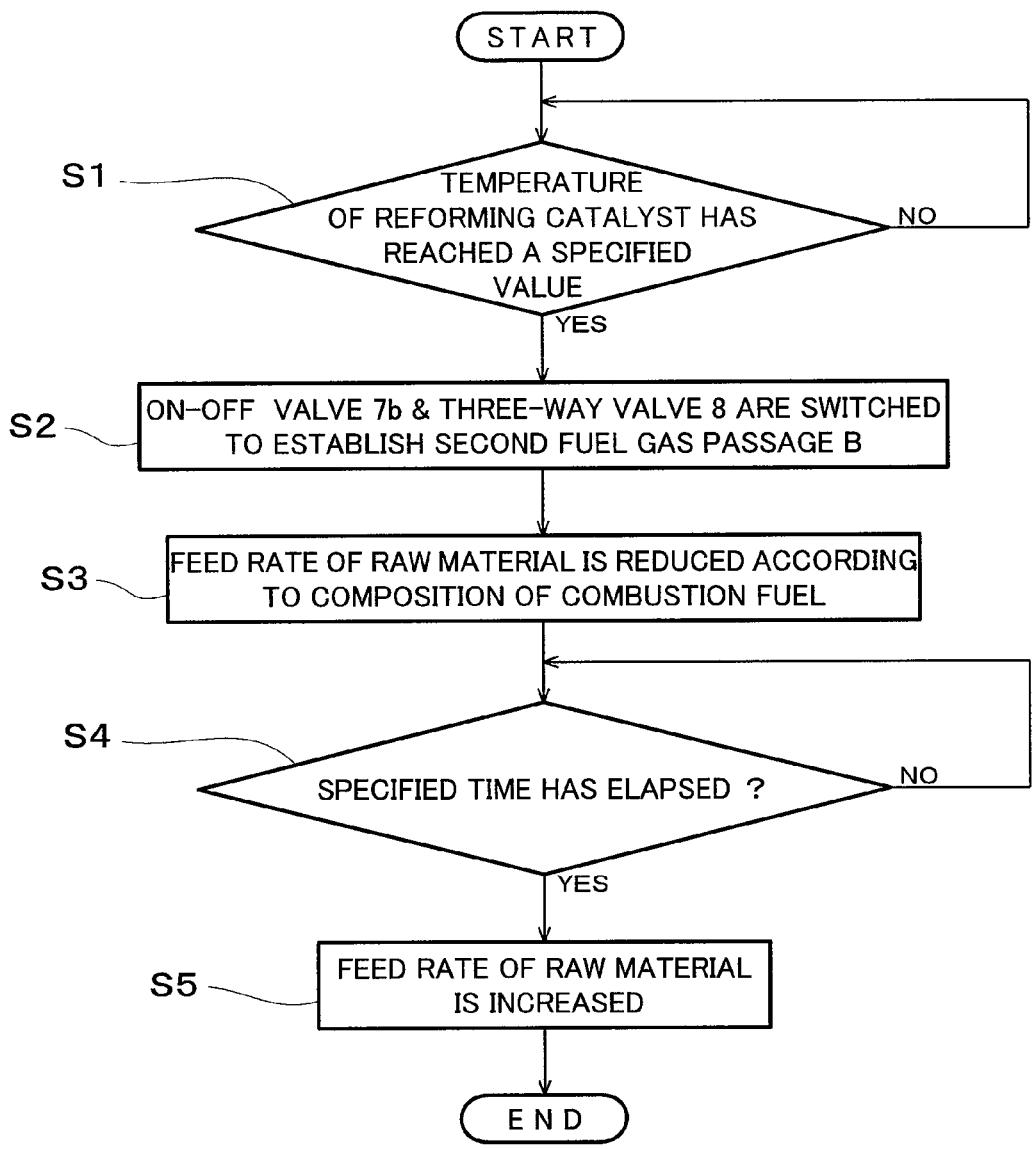
FIG. 7 is a flow chart that schematically shows part of the operation of the fuel cell system according to the third embodiment of the invention.

FIG. 7 is a flow chart that schematically shows part of the operation of the fuel cell system according to the third embodiment of the invention.

As shown in FIG. 7, in the third embodiment, if it is determined that the temperature of the reforming catalyst of the reformer 2 has reached a specified value ("YES" at Step S1), the controller 101 controls the on-off valve 7b and the three-way valve 8 to establish the second fuel gas passage B by the first route R1, the fourth route R4, the fuel gas flow path 1a, the fifth route R5 and the third route R3, similarly to the first embodiment (Step S2).

Then, the controller 101 causes the flame sensor 11 to continuously detect the hydrocarbon concentration of the combustion fuel supplied to the combustion burner 2a, estimates a change (an increase in the raw material concentration) in the composition of the combustion fuel from the increase in the detected hydrocarbon concentration, and controls the raw material feeder 10 so as to gradually reduce the feed rate of the raw material to the reformer 2 according to the change in the composition of the combustion fuel. Herein, a data table for the proper raw material feed rate corresponding to the composition of the combustion fuel is prestored in the memory (not shown in FIG. 6) of the controller 101. Based on the data of this prestored data table, the controller 101 controls the raw material feeder 10 to properly reduce the feed rate of the raw material to the reformer 2 (Step S3).

Thereafter, if the whole amount of the raw material (natural gas) is discharged from the fuel gas flow path 1a of the fuel cell 1 and the timer of the controller 101 determines that the time required for combusting the whole amount of the raw material (natural gas) in the combustion burner 2a has elapsed ("YES" at Step S4), the controller 101 then controls the raw material feeder 10 so as to increase the feed rate of the raw material to the reformer 2 (Step S5).

The above configuration enables it to effectively prevent accidental fire and incomplete combustion in the combustion burner 2a, because the feed rate of the raw material to the reformer 2 is properly reduced by the raw material feeder 10 in accordance with a change (an increase in the raw material concentration) in the composition of the combustion fuel supplied to the combustion burner 2a which change has been detected by the frame sensor 11 that serves as the raw material concentration detector of the invention. Thereby, ideal progression of the combustion reaction in the combustion burner 2a becomes possible in the transition period in which feeding of the fuel gas to the fuel cell 1 starts, the fuel gas being generated in the reformer 2 that serves as the fuel gas generator.

In the fuel cell system 300 of the third embodiment described above, the combustion burner 2a has the flame-rod type flame sensor 11 to detect the raw material concentration of the combustion fuel and check a change in the composition of the combustion fuel. This could be replaced with the following alternative configuration. The off-gas passage (the third route R3 or the fifth route R5) of the invention is provided with a hydrogen concentration detector serving as the gas concentration detector of the invention, and a change in the composition of the combustion fuel (an increase in the raw material concentration) is estimated based on a decrease in the hydrogen concentration detected by the hydrogen concentration detector. According to the estimated change in the composition of the combustion fuel, the output of the raw material feeder 10 is controlled so as to properly reduce the feed rate of the raw material to the combustion burner 2a.

In the fuel cell system 300 of the third embodiment described above, the composition of the combustion fuel is estimated based on the raw material concentration detected by the flame sensor 11 that serves as the raw material concentration detector of the invention, and the feed rate of the raw material is reduced to an appropriate feed rate by referring to the table data relating to the appropriate material feed rate according to the composition of the combustion fuel stored in the memory, based on the estimated composition of the combustion fuel. This may be replaced with the following alternative configuration. The relationship between the raw material concentration detected by the raw material concentration detector and the appropriate feed rate of the raw material is prestored in the form of table data in the memory, and the optimum raw material feed rate is determined directly from the raw material concentration detected by the raw material detector without estimating the composition of the combustion fuel. This configuration is applicable to the case where a change in the composition of the combustion fuel is estimated, using the hydrogen concentration detector instead of the above-described raw material concentration detector.

A modification of this embodiment will be described.

In this modification, during a start-up operation of the fuel cell system 300, not only the fuel gas generated in the fuel gas generator is supplied but also natural gas is supplied as assist gas from the raw material feeder 10 to the combustion burner 2a through the flow rate control valve 12.

Instead of the above configuration in which the feed rate of the raw material to the reformer 2 is properly reduced by the raw material feeder 10 according to a change in the composition of the combustion fuel supplied to the combustion burner 2a (an increase in the raw material concentration), an alternative configuration may be employed according to which the feed rate of the raw material supplied from the raw material feeder 10 to the combustion burner 2a is properly reduced by reducing the open degree of the flow rate control valve 12 with the controller 101 in accordance with a change in the composition of the combustion fuel supplied to the combustion burner 2a (an increase in the raw material concentration). In this case, at Step S3 shown in FIG. 7, the process described by "the feed rate of the raw material to the reformer 2 is gradually reduced by the raw material feeder 10" is replaced by the process "the feed rate of the raw material to the combustion burner 2a is gradually reduced by the flow rate control valve 12". In this modification, the flow rate control valve 12 serves as the combustion fuel feeder of the invention.

This modification may be applied not only to this embodiment but also to the first and second embodiments.

As described above, according to the invention, when combusting the raw material (natural gas) that serves as a substitution gas in the combustion burner 2a, the feed rate of the natural gas to the combustion burner 2a is reduced by reducing the feed rate of the raw material to the reformer 2 by the raw material feeder 10, so that the generation of carbon monoxide during the combustion of the natural gas can be suppressed. This makes it possible to provide an environmentally friendly fuel cell system that effectively suppresses carbon monoxide emission at the start of a power generating operation with a simple configuration to mitigate the adverse effect upon the ecosystem.

As the criterion for the determination on whether or not the feed rate of the raw material to the reformer 2 should be increased by the raw material feeder 10, "a specified period of time" is used in the first and third embodiments and "a specified threshold concentration" or "a specified output value" is used in the second embodiment. However, these criteria need not to be used individually but may be used in combination.

That is, if the controller 101 recognizes an elapse of the specified period of time at Step S4 and the carbon monoxide concentration detected by the CO sensor 9 has reached a value equal to or lower than the specified threshold value (or the output value of the CO sensor 9 has reached a value equal to or lower than the specified output value) at FIGS. 2 and 7, the process may proceed to Step S5 shown in FIGS. 2, 7. This configuration achieves the same effect as of the first to third embodiments.

INDUSTRIAL APPLICABILITY

The fuel cell systems described according to the embodiments of the invention are industrially applicable as an environmentally friendly fuel cell system capable of effectively suppressing carbon monoxide emission at the start of a power generating operation with a simple structure to mitigate the adverse effect upon the ecosystem.

The invention claimed is:
1. A fuel cell system comprising:
a fuel cell configured to generate electric power by use of a fuel gas and an oxidizing gas;
a fuel gas generator configured to generate the fuel gas by reforming a raw material through a reforming reaction;
a combustor configured to supply heat to said fuel gas generator to promote the reforming reaction;
a combustion fuel feeder configured to control a feed rate of combustion fuel to said combustor;
an air feeder configured to supply air to said combustor;
a fuel gas passage configured to supply the fuel gas from said fuel gas generator to said fuel cell;
an off gas passage configured to supply part of the fuel gas from said fuel cell to said combustor, which part has been left without being used in the electric power generation;

a bypass passage configured to connect said fuel gas passage and said off gas passage such that the fuel gas generated by said fuel gas generator is supplied to said combustor, so as to bypass said fuel cell;

a switching valve configured to switch a destination of the fuel gas generated in said fuel gas generator between said fuel cell and said bypass passage; and a controller, wherein an inside of said fuel cell is filled with the raw material before said controller controls said switching valve so as to switch from said bypass passage to said fuel cell to supply the fuel gas generated in said fuel gas generator to said fuel cell, and wherein said controller controls said combustion fuel feeder so as to reduce the feed rate of the combustion fuel to said combustor when controlling said switching valve so as to switch from said bypass passage to said fuel cell to supply the fuel gas generated in said fuel gas generator to said fuel cell.

2. The fuel cell system according to claim 1,
wherein said combustion fuel feeder is a raw material feeder configured to control a feed rate of the raw material to said fuel gas generator; and
wherein said controller controls said raw material feeder so as to reduce the feed rate of the raw material when controlling said switching valve so as to switch from said bypass passage to said fuel cell to supply the fuel gas generated in said fuel gas generator to said fuel cell.

3. The fuel cell system according to claim 1,
wherein said controller controls said combustion fuel feeder so as to reduce the feed rate of the combustion fuel to said combustor in accordance with a composition of the raw material that fills the inside of said fuel cell.

4. The fuel cell system according to claim 1,
wherein said controller controls said combustion fuel feeder so as to satisfy an air ratio of 1 or more to reduce the feed rate of the combustion fuel to said combustor, while controlling said air feeder so as to maintain a feed rate of the air to said combustor.

5. The fuel cell system according to claim 1,
wherein said controller controls said switching valve such that the fuel gas generated in said fuel gas generator is supplied to said combustor by way of said bypass passage until said fuel gas generator satisfies a specified operating condition; and
wherein when the specified operating condition is satisfied, said controller controls said switching valve so as to switch the destination of the fuel gas generated in said fuel gas generator from said bypass passage to said fuel cell and controls said combustion fuel feeder so as to reduce the feed rate of the combustion fuel to said combustor.

6. The fuel cell system according to claim 1,
wherein said controller controls said combustion fuel feeder to reduce the feed rate of the combustion fuel to said combustor, before controlling said switching valve so as to shut off said bypass passage to allow a supply of the fuel gas from said fuel gas generator to said fuel cell.

7. The fuel cell system according to claim 1,
wherein said controller controls said combustion fuel feeder so as to increase the feed rate of the combustion fuel to said combustor, after an elapse of a specified period of time after said controller controls said combustion fuel feeder so as to reduce the feed rate of the combustion fuel to said combustor.

8. The fuel cell system according to claim 1, further comprising a CO detector configured to detect carbon monoxide contained in an exhaust gas discharged from said combustor,
wherein said controller controls said combustion fuel feeder so as to increase the feed rate of the combustion fuel to said combustor, when an output value of said CO detector drops to a specified value or less or a concentration of carbon monoxide obtained based on the output value of said CO detector drops to a specified value or less, after said controller controls said combustion fuel feeder so as to reduce the feed rate of the combustion fuel to said combustor.

9. The fuel cell system according to claim 1, wherein said controller controls said combustion fuel feeder so as to reduce the feed rate of the combustion fuel to said combustor in a stepwise fashion involving one or more steps, or in a continuous fashion.

10. The fuel cell system according to claim 1, wherein said raw material is hydrocarbon gas.

11. The fuel cell system according to claim 1, further comprising a raw material feeder configured to supply the raw material;
wherein said controller allows said raw material feeder to supply the raw material to said fuel cell to fill the inside of said fuel cell with the raw material in shutdown operation or start-up operation.

12. The fuel cell system according to claim 1, further comprising a gas concentration detector provided in said combustor or said off gas passage, for detecting a specified gas concentration;
wherein said controller controls said combustion fuel feeder in response to an output signal from said gas concentration detector to reduce the feed rate of the combustion fuel to said combustor, after controlling said switching valve so as to switch from said bypass passage to said fuel cell to allow a supply of the fuel gas generated in said fuel gas generator to said fuel cell.

13. The fuel cell system according to claim 12,
wherein said controller controls said combustion fuel feeder so as to reduce the feed rate of the combustion fuel to said combustor, when said gas concentration detector detects an increase in raw material concentration.

14. The fuel cell system according to claim 13, further comprising a flame-rod type flame sensor provided as said gas concentration detector in said combustor,
wherein said raw material is a gas containing hydrocarbon, and
wherein said controller controls said combustion fuel feeder to reduce the feed rate of the combustion fuel to said combustor, when said flame sensor detects an increase in the raw material concentration, after said controller controls said switching valve so as to switch from said bypass passage to said fuel cell to allow a supply of the fuel gas generated in said fuel gas generator to said fuel cell.

* * * * *